United States Patent [19]
Karlsson

[11] Patent Number: 4,583,699
[45] Date of Patent: Apr. 22, 1986

[54] LEVEL WINDING FISHING REEL

[75] Inventor: Jardin U. Karlsson, Mörrum, Sweden

[73] Assignee: ABU Aktiebolag, Svangsta, Sweden

[21] Appl. No.: 601,196

[22] Filed: Apr. 17, 1984

[51] Int. Cl.⁴ ............................................ A01K 89/04
[52] U.S. Cl. ................................ 242/84.42; 242/158.3
[58] Field of Search ............ 242/84.42, 84.43, 158 R, 242/158.2, 158.3

[56] References Cited

U.S. PATENT DOCUMENTS

| | | | |
|---|---|---|---|
| 1,468,128 | 9/1923 | Adams | 242/84.42 |
| 2,641,417 | 6/1953 | Kinsey | 242/84.42 |
| 3,111,287 | 11/1963 | Baenziger | 242/84.42 |

FOREIGN PATENT DOCUMENTS 671216  2/1939  Fed. Rep. of Germany ... 242/84.42
40-21220  9/1965  Japan ................................ 242/84.42

Primary Examiner—Billy S. Taylor
Attorney, Agent, or Firm—Sheridan Neimark; Karl W. Flocks; A. Fred Starobin

[57] ABSTRACT

A level-wind mechanism for fishing reels using a line-laying element having two parts normally reciprocable by means of a slide operated by a hand crank via a transmission. The two parts are disengageable and reengageable relative to said slide by rotation of the latter in one or the other direction on a guide. The slide is rotatable in a direction for disengagement from said line-laying element by means of said slide guide by rotation of the latter by means of an operating member which also is adapted to disengage the line spool during casting so that said level-wind mechanism and said line spool are disengaged by one and the same disengagement operation.

5 Claims, 6 Drawing Figures

LEVEL WINDING FISHING REEL

The present invention relates to a fishing reel having a rotary line spool operated by means of a hand crank via a transmission. More particularly, the invention relates to a fishing reel which is equipped with a level-wind mechanism comprising an involute screw which, like the line spool, is rotatable by means of the hand crank.

During casting, it is desired that the line can run out as easily and with as little friction as possible, and over the years the construction of fishing reels of this type has been constantly improved. Thus, most fishing reels of this type are nowadays equipped with a mechanism for disengaging the line spool from the transmission driven by the crank, and furthermore constructions are known in which the level-wind mechanism with the involute screw is disengageable from the drive to be stopped. In constructions of the last-mentioned type, the involute screw and a slide driven by said screw and carrying a line-laying arm are stopped during casting. If the line is running through the generally U-shaped, elongated and narrow line-laying arm, the line-laying arm, unless it can be reciprocated along the involute screw, constitutes a breaking point which forms a line angle between the arm and the line spool. When the line is running out from the rotating line spool on which the line is evenly laid, the breaking angle of the line will vary, and thus the line friction will vary between zero and a maximum value depending upon, inter alia, the length of the line spool. It is true that in this construction one reason for a braking force on the line is eliminated since, during casting, the line is not forced to rotate the involute screw; however the friction of the line against the line-laying arm is increased, and furthermore this friction varies during each rotation of the line spool with the varying breaking angle, which may cause trouble during running-out of the line, when light lures are being used.

To eliminate entirely the tendency of the line-laying mechanism to brake the line during casting, and to ensure at the same time a positive guidance of the line for line-laying during retrieval of the line, it has been proposed to use a line-laying element consisting of a pair of parallel arms which normally define a narrow slot for the line during line retrieval, but which arms are separable so that the line during casting can run out without these arms forming breaking points for the line. At their outer ends, the parallel arms are guided by means of a guide which is parallel to the involute screw. At their opposite ends, the arms are carried each by one support which is guided on a guiding rod parallel to said involute screw and engageable and disengageable, respectively, relative to a slide which is reciprocable on and driven by the involute screw in conventional manner. After disengagement from the slide, the two arms can be moved widely apart by means of the line to let the line run freely from the arms. Reengagement is effected as soon as the rotation of the involute screw is started for line retrieval.

It has been found, however, that constructions of this type are extremely susceptible to breakdown. After release of the slide from the line-laying arms, effected for example by rotating the crank before a cast, the slide during the cast itself, and even before the line has begun to run out, may be returned and catch the arms anew. At best, the only thing that happens is that the level-wind mechanism is driven by the line and brakes the line during the cast, but there is a considerable risk that reengagement occurs at a time when the line runs out at such a high speed that the line breaks as a result of the sudden engagement of the level-wind mechanism whose acceleration inertia is considerable.

A problem generally encountered both with conventional level-wind mechanisms in which the line-laying loop always travels back and forth along the involute screw both during casting and during line retrieval, and with level-wind mechanisms in which the loop can be disengaged and the two parallel arms can be moved apart before a cast in order to leave the line free, is that one must usually have a line free from knots, i.e. a line which does not comprise two or more line lengths tied together by one or more knots.

When such a knot, during line retrieval, reaches the narrow slot between the two arms of the level-wind mechanism, the knot frequently cannot pass and is stopped, and already a short stop of the line may cause the angler to loose the fish.

It is the object of this invention to eliminate these shortcomings by providing a device by which the line-laying arms are safely disengaged from the involute screw and unintentional reengagement is prevented. Another object is to provide a device permitting releasable locking of the arms disengaged from the involute screw in widely moved apart positions relative to one another to permit free passage of a knot on the line between the arms upon casting and line retrieval.

These objects have now been achieved by the present invention which provides a fishing reel having a hand crank, a transmission driven by said crank, a line spool driven by said crank through said transmission, and a level-wind mechanism comprising an involute screw which is rotatable by means of the crank through said transmission, first guide means parallel to said involute screw, a slide which is slidably mounted on said first guide means, a carrier member which is supported by the slide and engages said involute screw for reciprocating said slide along said involute screw when the latter is rotated, second guide means parallel to said involute screw and to said first guide means, a pair of supports slidably mounted on said second guide means for reciprocal movement thereon, a pair of line- L laying arms each fixed to one of said supports, said supports with said arms being movable towards one another into a first position in which said arms define a relatively narrow, elongate slot for guiding the fishing line during retrieval thereof on the line spool, and away from one another into a second position in which said arms are moved apart and in which the fishing line goes substantially free from said arms, a device for engaging and disengaging the arm supports and the slide in relation to one another, and a device for releasably locking said arms in said second moved-apart position.

The invention will be described in more detail below, reference being had to the accompanying drawings in which FIG. 1 shows the front part of a fishing reel equipped with a level-wind mechanism according to the invention;

FIG. 6 illustrates, on a larger scale and partly in section, the support carrying the line-laying arm shown in FIG. 1, along the line VI—VI in FIG. 3.

Figure 1:
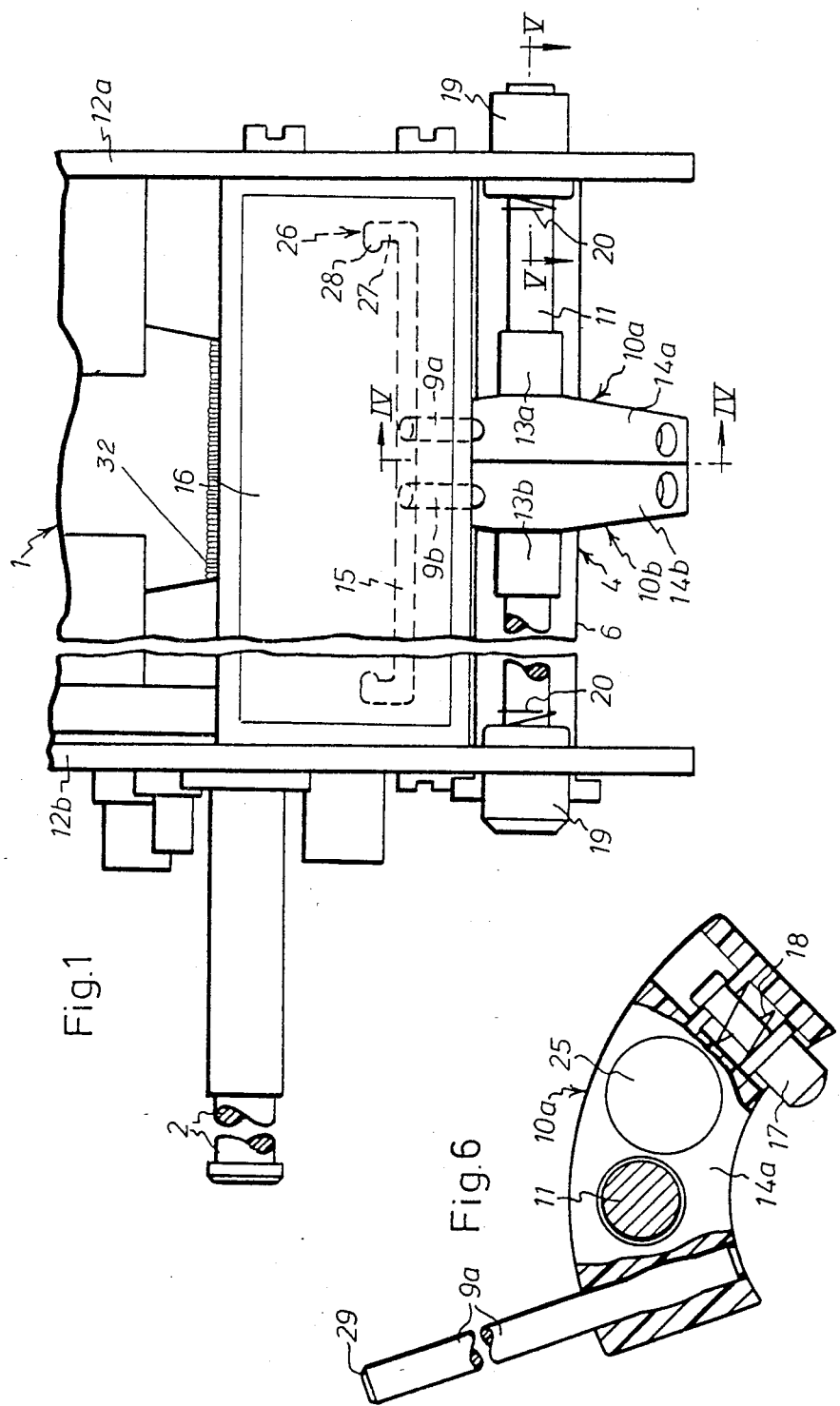

The fishing reel 1 shown in FIG. 1 comprises a conventional line spool (not shown) which is rotatable by means of the hand crank (not shown) of the fishing reel via a conventional transmission of which only a spindle 2 driven by the crank is shown. During retrieval of the fishing line on the line spool 32, the line usually is evenly laid by means of a level-wind mechanism.

As is well known, the level-wind mechanism of conventional fishing reels comprises an involute screw along which a slide engaging the thread of said involute screw is movable back and forth on a guide sleeve. The slide carries a line-laying arm, usually in the form of a narrow elongated loop through which the line extends. The slide is reciprocated by rotating the involute screw by means of the crank via a transmission.

Figure 4:
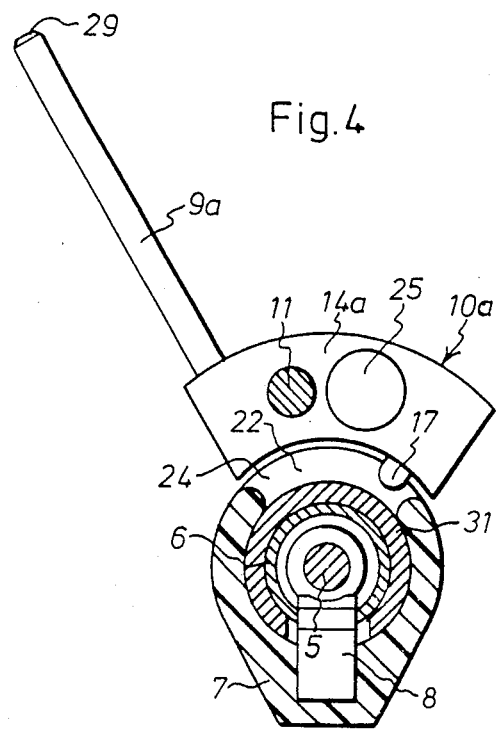
FIG. 4 is a section along line IV—IV in FIG. 1.

Also the embodiment according to the invention comprises a level-wind mechanism which is generally designated 4, an involute screw 5 which is surrounded and protected by a sleeve 6 which also forms a guide for a slide 7 supported by and reciprocable on said sleeve and engaging said involute screw via an engaging member 8 of known construction, such as a member usually termed "knife bolt" (FIG. 4).

The line-laying element proper consists of a pair of identical arms 9a, 9b. Each arm is carried, at its inner end and via a support 10a, 10b secured on said arm, by a guide rod 11 extending between a pair of opposite end walls 12a, 12b of the frame of the fishing reel. Each support consists of a guide sleeve 13a, 13b displaceably mounted on the guide rod 11 and having an enlarged head 14a, 14b at one end. The two arms 9a, 9b may be in the form of straight parallel rods of metal wire with outer end portions bent outwardly away from one another and guided in a guide slot 15 in a wall member 16 which is connected to and extends between the walls 12a, 12b and may be in the form of a plate.

The two guide sleeves 13a, 13b displaceably mounted on the guide rod 11 each carry a pin 17 mounted in a cavity in the respective head 14a, 14b and preferably slidably mounted and biased by means of a pressure spring 18 mounted in each of the cavities housing the pins 7 (FIG. 6). The spring 18 strives to hold the pin 17 in a normally protruding position.

Figure 5:
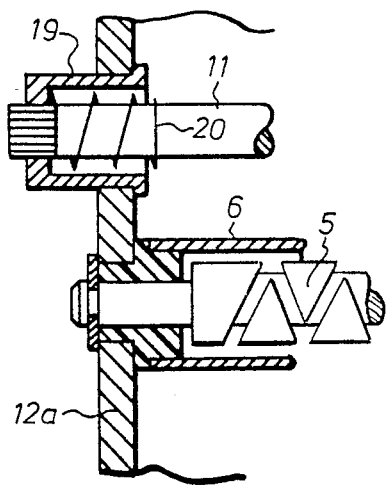
FIG. 5 is a section along line V—V in FIG. 1.

As will appear from FIG. 5, the guide rod 11 is mounted with its ends in bushings 19 provided in the end walls 12a, 12b, and each end of said guide rod 11 carries a coil spring 20 whose function will be described below.

Figure 3:
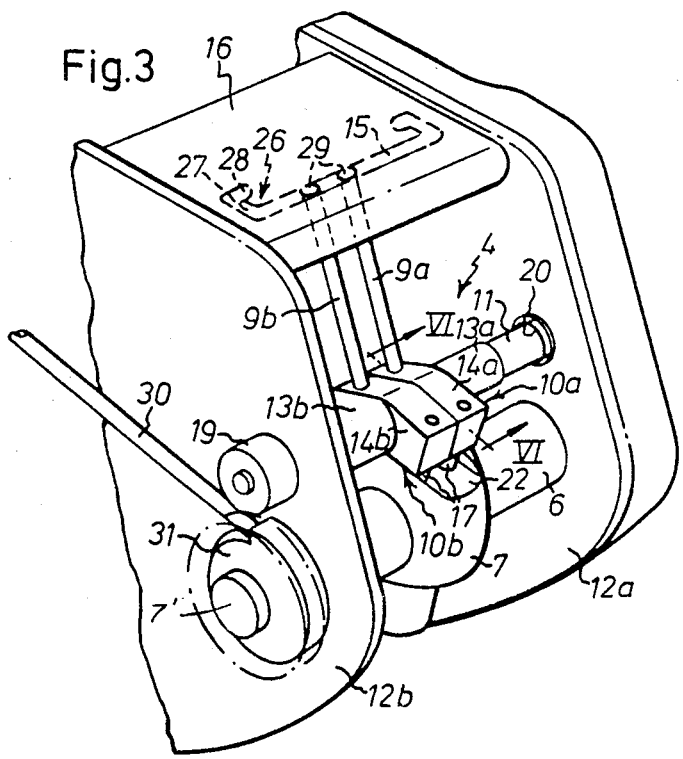

In the embodiment illustrated, the slide 7 consists of an annular member having a recess 22 which preferably has a planar bottom and may be provided with two parallel bores 23 adapted to receive the pins 17 to maintain the sleeves 13a, 13b side by side, in which position the two arms 9a, 9b are positioned as shown in FIGS. 1 and 3.

The recess 22 in the slide 7 is defined laterally by wall members 24 which are radial and preferably rounded at their side facing the adjacent end of the involute screw to form cam surfaces for moving the pin 17 supported by the respective guide sleeve 13a and 13b inwardly within the sleeve head 14a, 14b so that the pin 17 can pass over the wall member 24 to snap into the recess 22 and into the respective bore 23 (the position shown in FIGS. 3 and 4).

Figure 2:
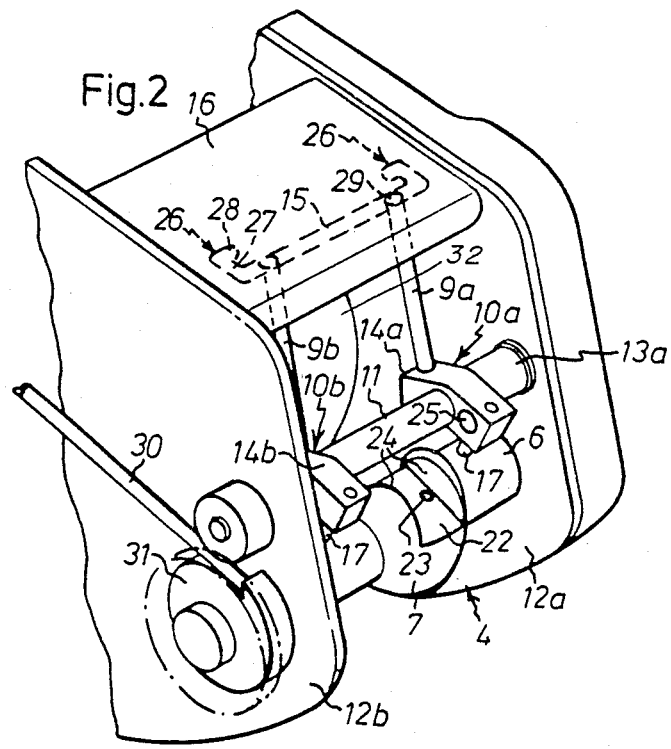
FIGS. 2 and 3 are schematic perspective views of the part shown in FIG. 1, illustrating two different positions of the line-laying arms of the level-wind mechanism, and showing a modification including a mechanism which assists in setting the slide to a position wherein the arms are released therefrom.

By rocking the slide 7 in clockwise direction from the position shown in FIG. 3 to the position shown in FIG. 2, which is made possible by the pins 17 being mounted displaceably against the action of the springs 18, the supports 10a, 10b with the line-laying arms 9a, 9b can be moved apart into the position shown in FIG. 2 which corresponds to a casting position in which the line can run out freely without sliding against any of the arms. The arms 9a, 9b can be moved apart by means of the users fingers, but it will be evident from FIG. 3 and FIG. 2 that the spring biased pins 17 will be pressed upwardly by the bottom surface of the recess 22 in the slide, when the slide is angularly rocked from its position in FIG. 3 to its position in FIG. 2. Thus, the extended length of the pins will be shortened, and the ends of the pins, which ends are rounded (see FIG. 6), leave the bores 23 and are moved on the bottom surface 22 to a position adjacent one of the longitudinal edges thereof. By reciprocating the slide and stopping the arms, the rounded ends of the pins will ride up on and over the rim formed by the respective wall member 24. It is to be observed that the height of that rim over the bottom of the recess 22 diminishes in the direction of the longitudinal edge of the recess 22, whereby a relatively small push on the arm will cause it to leave the recess.

When the bottom surface of the recess 22 presses the spring biased pins 17 upwardly, the pressure force tends to pivot the arms 9a, 9b counterclockwise. However, the arms are prevented from being pivoted by the guide slot 15 until the respective arm reaches a position, where the slot 15 ends in a recess 26 formed to receive the outer end of that arm. Thus, when the slide 7 is reciprocated and one arm, such as the arm 9a, has been caught by the right-hand recess 26, this arm 9a is stopped and forced to leave the recess 22 in the slide. When the slide during its reciprocal movement reaches the left end position, the other arm 9b will be caught, stopped and moved out of engagement with the recess 22. When the slide is returned to its original angular position, and the slide is moved in the direction of one of the arms and its supports, the corresponding pin 17 will slide over the rounded outer end surface of the slide and snap into engagement with the recess 22. By means of the user's fingers the outer end of the arm can be unhooked from recess 26 at the end of the guide slot 15. During a subsequent cast, neither one nor the other arm is displaced by means of the slide since they are released from the latter.

When, in the adjustment position shown in FIG. 2 of the level-wind mechanism, the involute screw is rotated by means of the crank, the slide is rotated by the friction between the engaging member 8 and the involute screw immediately back into the angular position shown in FIG. 3, and on continued rotation of the involute screw 5 by means of the crank, the slide 7 is moved for example in the direction to the right, the pins, such as the pin 17 mounted on the support 10a, first being inserted in the recess 22 and then retained therein by means of the spring 18. On continued movement of the slide, the arm 9a is then carried along, and when the slide approaches the left-hand end position with respect to FIG. 3, the carrier pin 17 of the other support 10b is caught similarly, and then also the other arm 9b will be reciprocated.

For holding the two arms together in the position shown in FIGS. 1 and 2, each support has a small but relatively strong permanent magnet 25 mounted in a recess in the respective head 14a, 14b so that the south and north poles of the magnets facing one another lie substantially on a level with the opposing planar sides of the two heads 14a, 14b.

In order safely to maintain the arms 9a, 9b of the level-wind mechanism stationary during casting, the arms may be hooked with their outer ends in recesses 26 in the member 16. Each such recess is in the form of a short slot 27 which is connected perpendicularly to the guide slot 15 and which, in its turn, has a small inwardly directed extension 28. As will appear from FIGS. 2 and 3, the arms 9a, 9b to be hooked and locked in the recesses 26 each have a short inwardly directed end projection 29.

The two arms 9a, 9b can be maintained disengaged from the slide 7 in the position shown in FIG. 2 also during line retrieval. A knot between two tied-together line lengths is then entirely free to pass between the separated arms, which is extremely advantageous in fishing reels equipped with a line spool having a large line capacity. During fishing, the first half of the line usually is the one which is worn most, and it is this part of the line that is used during casting, while the remaining part of the line merely runs out from the line spool at such occasions when a fish has been hooked and is to be landed. The device according to the invention makes it possible to tie together line lengths by means of knots without causing inconvenience to the angler during casting and line retrieval.

To return the arms 9a, 9b from the position shown in FIG. 2 to the position shown in, FIGS. 1 and 3, the arms are moved by means of the user's fingers a further slight distance away from one another against the action of the springs 20 with which the guide sleeves 13a, 13b of the supports 10a, 10b are engaged with their outwardly directed ends, as in FIG. 2. It will be appreciated that the springs 20 retain the arms by spring action in the separated position (FIG. 2) when the end projections 29 of the arms are inserted in the recesses 26 of the member 16.

As will appear from the above, disengagement and reengagement of the line-laying arms in relation to the slide is easily carried out, and the line-laying arms or their supports are automatically caught again as soon as the line spool and the involute screw are rotated by means of the crank for line retrieval during which the line is evenly laid on the line spool.

The device according to the invention ensures that the level-wind mechanism is released from the line already during the first stage of a cast, which is especially advantageous in that the line speed is at its highest at the beginning of line run-out so that braking of the line would be considerable if the line during this stage is allowed to drive the level-wind mechanism.

Several details in the level-wind mechanism may, of course, have a different design than in the above embodiment. For example, the slide 7 can be swung out of engagement with the supports of the arms 9a, 9b by means of a rod 30 which is actuated by an operating member (not shown) for disengaging the spool. The rod 30 may actuate a small roller 7' connected with the guide sleeve 6 on which the slide 7 is movable so that the sleeve 6 and the slide 7, upon disengagement of the line spool from the transmission operated by the crank, is swung automatically from the position shown in FIG. 3 to the position shown in FIG. 2, whereupon the arms 9a, 9b can be moved apart and locked in the parking positions in which they are shown in FIG. 2.

What I claim and desire to secure by Letters Patent is:

1. A fishing reel comprising a spindle a line spool and a level-wind mechanism including an involute screw, said line spool and involute screw being rotatable by means of said spindle through a transmission, first guide means parallel to said involute screw, a slide slidably mounted on said first guide means and having means in engagement with said involute screw to be reciprocated thereby along said first guide means when said involute screw is rotated, second guide means parallel to said involute screw and to said first guide means, a pair of supports slidably mounted on said second guide means for reciprocal movement thereon between end positions, a pair of line-laying arms having opposite outer and inner ends and being fixed at the inner ends thereof to and supported by the respective one of said supports to be reciprocated thereby, said supports with said arms being movable by means of said transmission via said involute screw and said slide along said second guide means from inoperative spaced-apart end positions in which said arms are sufficiently spaced-apart in relation to each other to permit the fishing line to go substantially free from said arms, and to operative adjacent end positions, in which said arms define a relatively narrow, elongate line guiding slot, engaging and disengaging means comprising disengageable engaging means supported by said slide and said supports and including cam means for enabling said engaging means of said support to enter, from a disengaged position, into engagement with said engaging means of said slide when said supports with said arms are moved into said operative positions in relation to each other, such that said supports with said arms thereupon will be reciprocable in unison when being in said operative positions in relation to each other for guiding the fishing line during retrieval thereof on the line spool, said fishing reel further comprising third guide means parallel to said first and second guide means for guiding said arms at the outer ends thereof during said reciprocal movements, said third guide means having cooperable locking means for locking said arms releasably by mutual engagement of said arms with said locking means when said supports with said arms disengaged from said slide are in said inoperative positions, whereby movements of said supports are prevented when said arms are disengaged from said slide and said arms are locked in relation to said third guide means.

2. A fishing reel as claimed in claim 1, wherein said third guide means comprises a stationary guide slot extending in parallel to said first and second guide means and receiving said outer ends of said arms to guide said outer ends upon movement of said arms back and forth between said end positions, and wherein said means for releasably locking said arms in said spaced-apart inoperative positions comprises a pair of recesses connected to said guide slot at said inoperative end positions, each of said guide slot recesses being adapted for the introduction of the outer end portion of the respective one of said arms in the respective one of said recesses to releasably lock said respective one of said arms therein.

3. A fishing reel as claimed in claim 2, further comprising a pair of springs mounted spaced apart on said second guide means, said supports in said spaced-apart inoperative positions thereof resting against and between said springs, each one of said supports being adjacent one spring, said springs, when said supports are in said inoperative positions, exerting a pressure force on said respective adjacent support in a direction away from said adjacent spring, whereby said arms are retained in their releasably locked positions relative to said recesses.

4. A fishing reel as claimed in claim 1 and comprising a manually actuable mechanism for disengaging the line spool from said transmission to permit the line spool to be freely rotatable during casting, and wherein said first guide means is in the form of a sleeve, which coaxially and partially encloses said involute screw, said sleeve being mounted rotatably in opposite directions about the rotational axis of said involute screw, said engaging and disengaging means further comprising means connected to and operated by said manually actuable mechanism when said manually actuable mechanism is actuated, for disengaging the line spool, thereby rotating said sleeve from first angular position into second angular position and facilitating disengagement of said supports from the slide by rotation of the involute screw for moving the slide therealong.

5. A fishing reel as claimed in claim 4, wherein said engaging and disengaging means also comprises means, acting by friction between said involute screw and said sleeve, for returning said slide to said first position when the involute screw is rotated, said slide in said first position facilitating reengagement of said engaging means of said support with said engagement means of said slide.

* * * * *